Patented Jan. 5, 1937

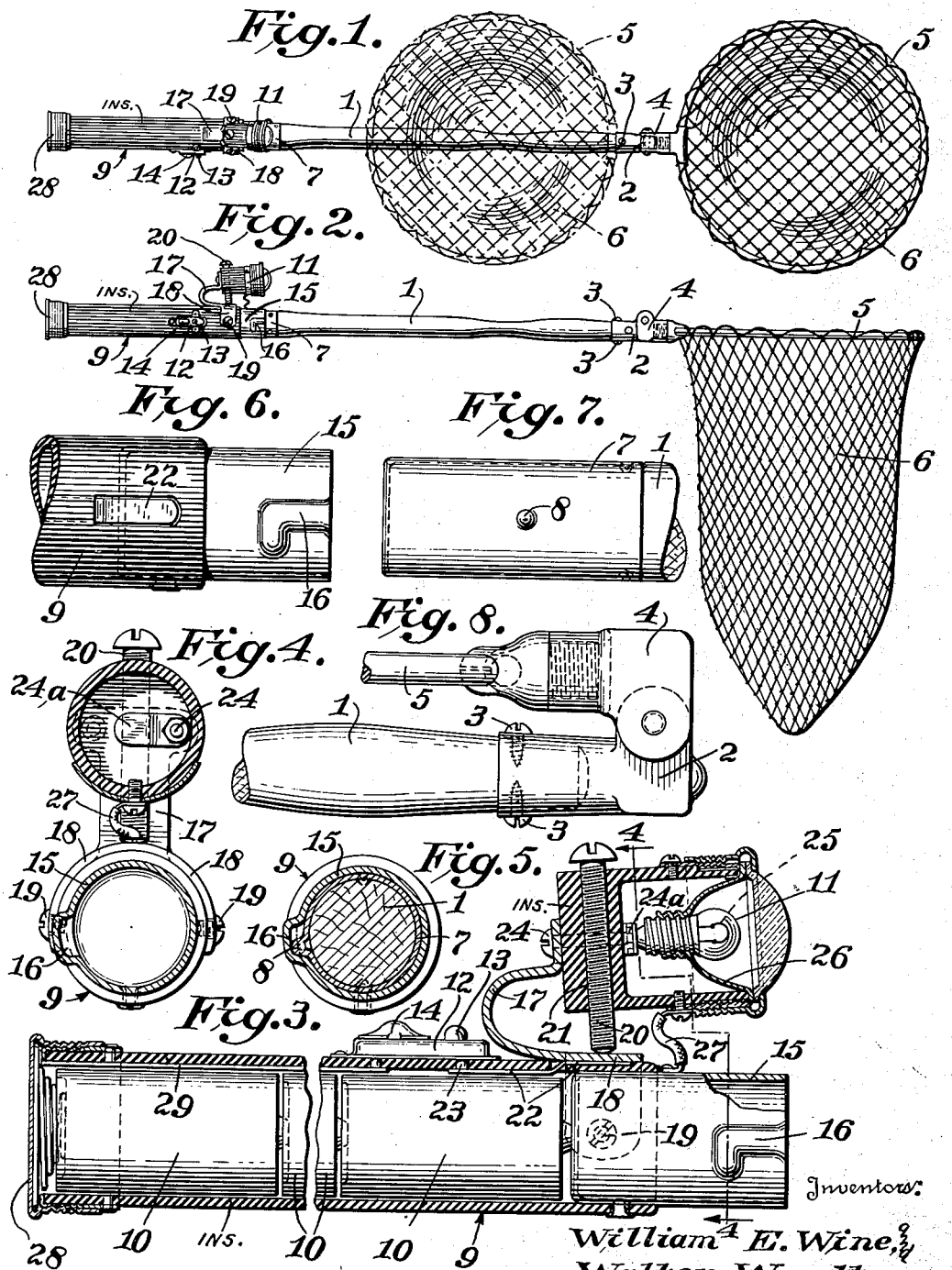

2,066,439

UNITED STATES PATENT OFFICE 2,066,439

LANDING NET

William E. Wine and Walter Wyatt,
Washington, D. C.

Application April 16, 1934, Serial No. 720,884

1 Claim. (Cl. 43—12)

Our invention relates to new and useful improvements in landing nets, and more particularly to a net wherein the shaft of the net is adapted to carry, when desired, a detachable handle which, in turn, is provided with batteries, and on which handle is adjustably mounted a lamp, so that in landing fish in the evening or night a light whose rays will be parallel with the shaft may be quickly snapped on to illuminate the water and make it far easier to land the hooked fish.

An object of the invention is to provide a landing net which may be used in the day-time without this handle, the end of the shaft, however, being so constructed that the detachable handle carrying the lamp and batteries may be easily attached and locked in position.

A further object of the invention is to provide a handle which carries the necessary electric cells and on which handle, rather than in the end thereof, is mounted an adjustable lamp, so that the rays of the light may be elevated or lowered as desired. Also, the distal end of the handle will be provided with a locking means that cooperates with the locking means on the shaft of the net, so that it is but the matter of a moment to secure the handle in place or remove it from the shaft when so desired.

With these and other objects in view, the invention consists in certain new and novel arrangements and combination of parts, as will be hereinafter more fully described and pointed out in the claim.

Referring now to the drawing showing a preferred embodiment,

Fig. 1 is a plan view of the device with the net extended ready for use, the net being shown in full lines; the net also being shown folded back in dash and dot lines in inoperative position for convenience in carrying;

Fig. 2 is a side elevation of Fig. 1 showing the net in its operative position;

Fig. 3 is an enlarged detail sectional view of the handle portion which carries the lamp;

Fig. 4 is an enlarged transverse sectional view on the line 4—4 of Fig. 3;

Fig. 5 is an enlarged detail of the distal end of the handle portion to show the detachable feature;

Fig. 6 is a similar view of the end or socket portion of the handle showing clearly the locking means or bayonet slot;

Fig. 7 is an enlarged view of the proximal end of the shaft showing the operating feature of the bayonet slot connection;

Fig. 8 is a fragmentary view of the proximal end of the net showing a hinge connection so that the net may be folded back out of use for convenient carrying purposes.

Referring now more particularly to the several views, and to Figs. 1 and 2 for the moment, there is shown a conventional shaft 1 of a landing or dip net, on the distal end of which is a small casting 2, which may be secured by the screws 3, and on which casting or stamping is mounted the movable hinge portion 4 which, in turn carries a ring 5, on which a net 6 is conveniently attached.

It will be understood that we have shown only one means for securing the net to the shaft 1 and any other desirable form might be likewise used. However, a foldable net of this kind is desirable for convenience in carrying.

To the proximal end of the shaft 1, there is preferably secured a metal cap 7 which is provided with a stud about midway its length. This stud is adapted to pass within a bayonet slot and lock the handle to the shaft, as will be shortly described.

Referring to what we term the handle or the handle portion 9, there will be seen a cylindrical tube forming a casing, in which there will be fitted several electrolytic cells 10 of the ordinary flash-light variety. These cells, of course, may contact with each other and also may contact with certain conductors, so that the lamp 11 may be flashed or turned on and off as desired. The casing may be made of well known phenol compounds, rubber, or other insulating material.

The handle 9 may also be a conventional flash-light case but will be changed or modified, as about to be described.

The casing is provided necessarily with the switch 12 having the conventional button 13 to merely flash the light and with a slide member 14 which may be operated to keep the light burning until the switch is again operated. As before mentioned, these parts are conventional and need no further description.

In the distal end of the handle portion 9, we provide a metal socket member 15, which is clearly illustrated in the several figures, which, in turn, is provided with a bayonet slot or raised portion 16, so that when the cap 7 of the shaft 1 is fitted within the socket 15 and either the socket or the shaft turned, the two parts will be securely locked until the parts are again rotated with relation to each other to unlock and remove the same.

As may be seen in Fig. 5, the small lamp 11 is, in turn, supported by a spring bracket 17 provided with a base 18 having wings curved to fit and be securely fastened to the handle 9 by the screws 19. Through the rear of the insulated base of the lamp 11 is provided the screw 20 which bears at its lower end on the base 18 of the spring bracket 17 and is fitted within a threaded opening 21 in the lamp base, so that the lamp may be tilted as desired to raise or lower the beam of light with relation to the shaft 1 and net 6.

In the handle 9, a metal strip 22 is connected with a metal conductor 23 from the switch, said strip extending through the casing and into contact with the spring bracket 17 under the base 18 thereof, so that the electric current may pass up through this spring bracket and to the rear of the small lamp bulb 11 by way of the screw 24 and spring contact 24a, through the filament 25, and the reflector 26 to the outside metal shell of the lamp, which is connected by a flexible wire 27 to the metal socket 15, which, in turn, forms electric connection with one side of the dry cells of the battery 10.

It will be noted that the socket 15 is in contact with one terminal of the battery to furnish a path or circuit through the several batteries, while in the rear of the handle may be seen the cap 28 which is in the electric circuit. There is also a further metal strip or conductor 29 from the cap which leads to the other side of the switch 14 to form a complete electric circuit. This part of the circuit, of course, is conventional in most "flash-lights".

In Fig. 3, the switch is shown on the top of the handle, but this is done merely for clearness of illustration.

From the foregoing, it will be seen that the landing net may be used in the day-time without the handle and its light. However, when fishing in the evening or at dark, it is but the matter of a moment to attach and lock the handle in place, so that the net may be now handled with the light directed across the open face thereof.

The device has proved very efficient in service and the handle with the electric cells therein add but little weight, having, in fact, a tendency to balance the net.

Many slight changes are possible in the construction hereinbefore set forth without in any manner departing from the spirit of the invention.

Having thus described our invention, what we claim as new and desire to secure by Letters Patent is:—

In a dip net consisting of a shaft and a net secured to one end thereof, the combination of a casing mounted on the other end of the shaft, said casing having means for interengagement with the shaft, electric cells mounted in the casing, a switch mounted on the casing, a flexible bracket, an electric lamp support secured to said bracket, an electric lamp positioned in the support, a circuit connecting the switch, lamp, and cells, and a set-screw mounted in the lamp support to engage the bracket and adapted to flex the bracket to guide a light beam from the lamp along the shaft and substantially above the upper end of the net.

WILLIAM E. WINE.
WALTER WYATT.